(12) United States Patent
Wood (10) Patent No.: US 6,799,672 B2
(45) Date of Patent: Oct. 5, 2004

(54) MATERIAL SORTATION SYSTEM (75) Inventor: John Nathan Wood, Hull (GB)

(73) Assignee: Fabricom Airport Systems (UK) Limited (GB)

( * ) Notice: Subject to any disclaimer, the term of this patent is extended or adjusted under 35 U.S.C. 154(b) by 0 days.

(21) Appl. No.: 10/380,894

(22) PCT Filed: Sep. 21, 2001

(86) PCT No.: PCT/GB01/04227
§ 371 (c)(1),
(2), (4) Date: Aug. 4, 2003

(87) PCT Pub. No.: WO02/24557
PCT Pub. Date: Mar. 28, 2002

(65) Prior Publication Data
US 2004/0109745 A1 Jun. 10, 2004

(30) Foreign Application Priority Data
Sep. 23, 2000 (GB) .............................................. 0023370

(51) Int. Cl.[7] .............................................. B65G 47/10
(52) U.S. Cl. ............................. 198/370.04; 198/370.03
(58) Field of Search ....................... 198/370.01, 370.03, 198/370.04, 369.3

(56) References Cited

U.S. PATENT DOCUMENTS 4,792,036 A * 12/1988 Heidelberg ............ 198/370.04
5,990,437 A * 11/1999 Coutant et al. ........ 198/370.04
6,206,170 B1 * 3/2001 Kissel et al. ........... 198/370.04
6,484,866 B1 * 11/2002 Fortenbery et al. ..... 198/370.04

FOREIGN PATENT DOCUMENTS

| WO | WO 97/09258 A | 3/1997 |
| WO | WO 00/32502 | 6/2000 |

* cited by examiner

Primary Examiner—James R. Bidwell
(74) Attorney, Agent, or Firm—Fay, Sharpe, Fagan, Minnich & McKee, LLP (57) ABSTRACT A sortation system comprises a plurality of transport units (32, 33) connected end to end to form a continuous train and mounted for movement along a track defining at intervals alongs its length destination ports at which items carried by the transport units may be discharged under the control of a central control system (41). The central control system (41) comprises a radio frequency transmitter device (39) through which control signals to the continuous train (32, 33) are transmitted and the continuous train (32, 33) comprises a radio frequency receiver device (39) for receiving the transmitted control signals. The radio frequency transmitter device (39) is connected to a leaky feed aerial (38) which extends the length of the track.

20 Claims, 4 Drawing Sheets

MATERIAL SORTATION SYSTEM

The present invention relates to a material sortation system and more particularly to a sortation system of the type comprising of a plurality of transport units, and movable on a track. Items to be sorted are loaded onto the transport units and are unloaded at specified addresses or destination ports along the track In a known material sortation system, each of the transport units comprises a tray which is connected to a tray tilting mechanism. The tray tilting mechanism allows the tray to be tilted to one side, but more usually to both sides, of the direction of travel of the tilt tray units in the track. In this way items loaded onto the trays can be discharged into selected destination ports In a further known material sortation system, each of the transport units comprises a small conveyor or 'cross belt'. The conveyor allows items, which are loaded upon it, to be propelled to either side of the direction of travel of the transport units along the track. In this way items loaded onto the conveyors can be discharged into selected destination ports.

Tilt tray and cross belt sorters are well known for their ability to handle a wide variety of products at large throughput rates and high speed with great accuracy. Tilt tray sorters are generally used in luggage handling systems at airports, central distribution warehouses, and parcel handling installations. Cross belts are more commonly used for the sortation of smaller items where the width of the destination port is narrow. The cross belt sorter powers the items into the chute whereas the tilt tray sorter allows product to drop into a destination port under the effect of gravity. As a consequence the width of the destination port can be made narrower for a cross belt sorter.

Tilt tray sorters are in the main mechanically operated, although electrically powered tilt tray units are known.

While an electrically powered tilt tray unit offers many advantages over a mechanical tilt tray unit, there are still some limitations to existing designs. A transmitter must be placed at each tip position along the track to initiate tilting and must be identified to control software within the sorter control system. Anytime a tip position is changed, the transmitter associated with it must be repositioned and changes in the control software need to be made. Furthermore there is considerable installation cost to install tip transmitters in terms of electrical site wiring, software and commissioning.

As a transmitter must be situated immediately adjacent to each tip position, a number of transmitters are required to produce a good fill pattern for wide chutes. Although it is relatively easy to install several transmitters for an electrically powered tilt tray unit, these transmitters all require wiring, software control, installation and commissioning time. There is also a limit on the number of tip positions for a single chute due to the physical size of the transmitters, their mounting brackets and associated wiring.

Once programmed the tip profile of the trays can not be readily changed. Yet it would be beneficial to be able to selectively vary the tray tip profile, for example, to tip a tilt tray more vigorously when luggage became wet, and to tip it gently when fragile items are carried.

One limitation of the throughput of a tilt tray sorter is the sorter speed. The number of items which can be sorted can be no greater than the number of trays passing the sorter loading area in a given time. Yet there is a maximum speed at which trays can safely travel along the track and above this speed there is always the risk that items on the trays will be flung off when the tray travels around bends in the track.

An electrically powered tilt tray sorter is also required to communicate with the sorter control system at specific locations around the sorter track. When the sorter stops the electrical power to the tilt tray units is switched off for safety reasons. When the sorter restarts all of the tilt tray units then need to be reset so that they will respond to tip commands. This function is performed at a certain position by means of a transmitter, which is activated as the tilt tray unit passes over it. Similarly when a tilt tray unit has had a fault, and is in the fault condition, the tilt tray unit is reset in this way.

The tilt tray units once reset, switch on an on board transmitter which signals to the sorter control system that it is ready to receive items. If a tilt tray unit develops a fault the on board transmitter is switched off. The status of the tilt tray units is read at set positions by an in track receiver.

Due to the fact that the transmitters and receivers are read at a limited number of set positions, inherent delays may occur on sorter start up as all of the tilt tray units need to pass the reset position before items can be loaded onto the trays and before tip commands can be passed to individual tilt tray units. If a fault condition occurs a tilt tray unit can not communicate the type of fault, only that a fault has occurred due to the fact that the on-board transmitter provided with it only allows an on or off signal.

For ease of understanding a typical electrically powered tilt tray sorter will now be described with reference to FIGS. 1 and 2 of the accompanying drawings.

Figure 2:
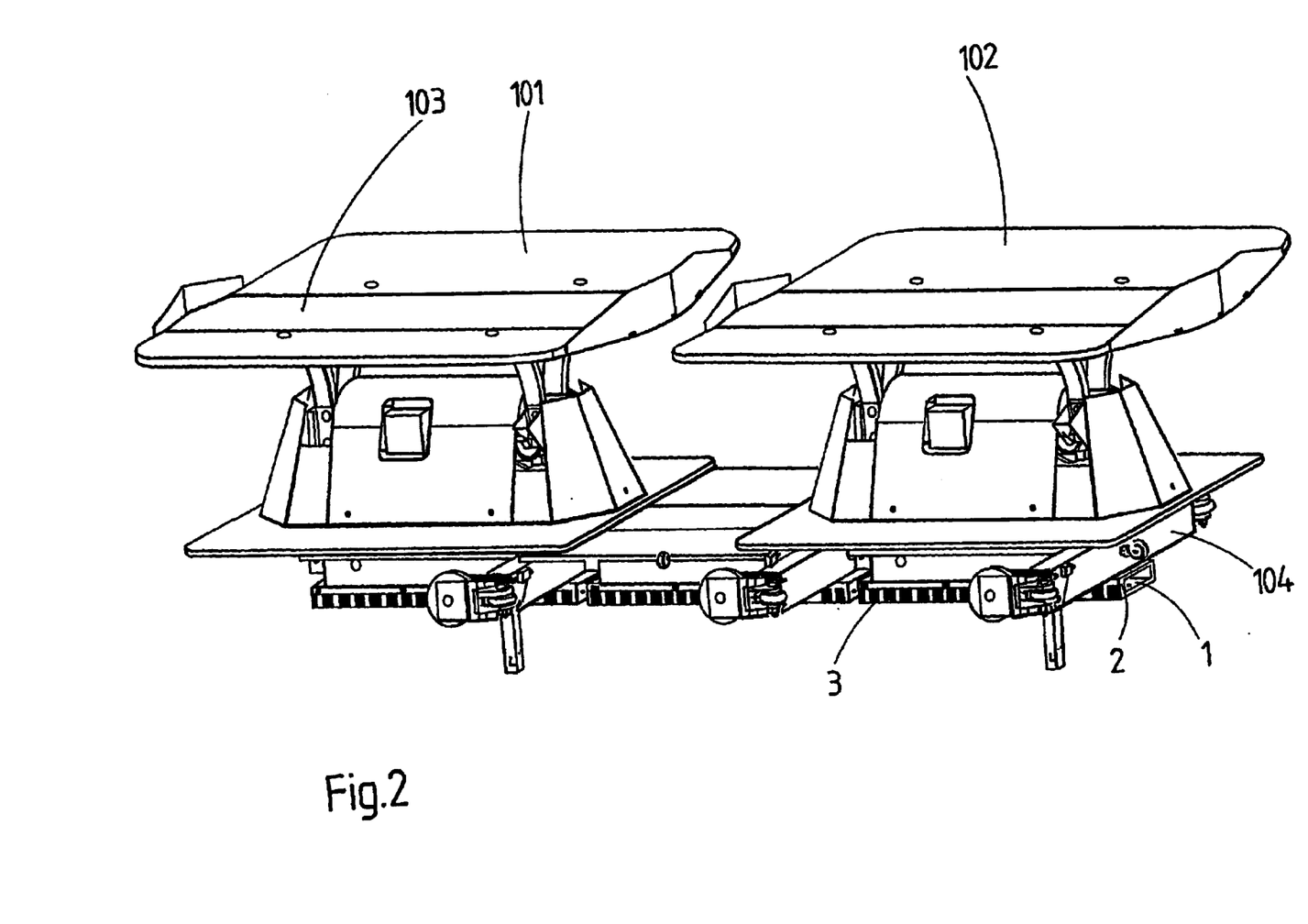
FIG. 2 is a perspective view of two transport units such as are shown in FIG. 1 connected together to form a continuous train.

Referring firstly to FIG. 2 there is shown two electrically powered tilt tray units 101 and 102 which are linked together to form a continuous train. Each tilt tray unit comprises in the lower part thereof an aluminium box section 2 which surrounds a steel plate 1. The steel plate 1 forms a reaction plate for a linear induction motor. These linear induction motors serve to drive the continuous train around a track (not shown). The speed of the continuous train around the track is determined by sensor means (not shown) on or adjacent to the track which is able to detect the marks on an encoder strip 3 which runs along the side of each box section 2 and a central control then uses this to regulate the speed of the continuous train around the track.

Figure 1:
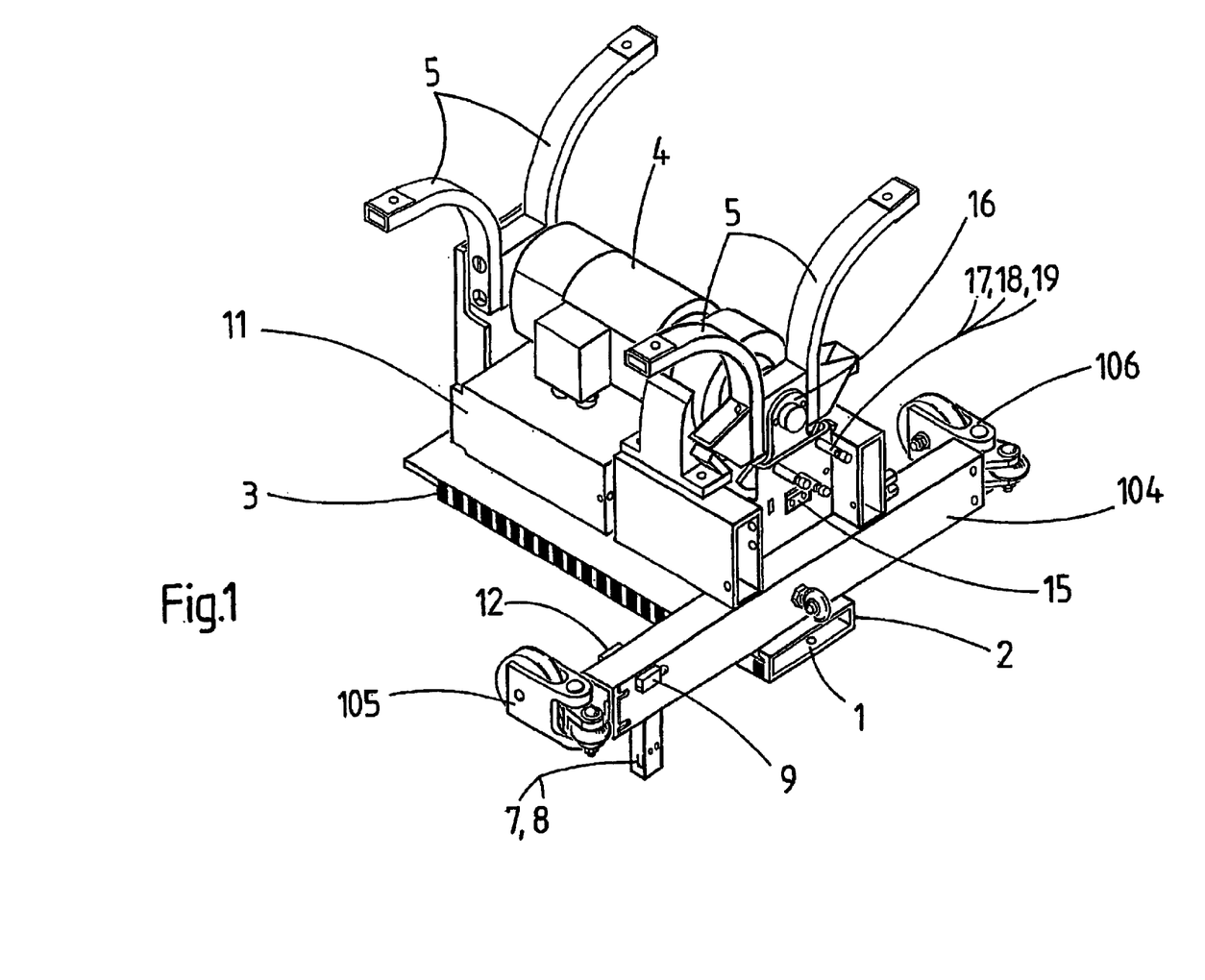
FIG. 1 is a perspective view of conventional transport unit for use in a transport sortation system.

Referring now to FIG. 1, each tilt tray unit comprises a braked electric motor 4 which is connected at each end thereof to a pair of arms 5 which in turn support a tray 103, shown only in FIG. 1 for ease of illusion. The motor 4 is operable to rotate the tray 103 backwards and forwards about its drive axis, thereby allowing items on the tray 103 to be discharged from it. The tray 103 is normally held in the horizontal position, as shown in FIG. 1, by the braked motor 4.

Each tilt tray unit comprises at the forward end thereof a horizontally extending support bar 104 which carries at each end a roller assembly 105 and 106. The roller assemblies 105 and 106 are each engageable in a respective channel defined by the aforementioned track. The operation of each tilt tray unit is controlled by receiver and transmitter devices carried by the unit itself and at predetermined locations around the track, as will now be explained.

Each tilt tray unit is reset after a fault condition or the loss of power by the operation of a tray reset transmitter mounted in the track. As a tilt tray unit passes over the reset transmitter, the transmitter is switched on, and a reset receiver (not shown) on the unit itself picks up the signal. The reset receiver outputs a signal to a controller 11 mounted on the tilt tray unit, which controller 11 effects a reset and enables the tilt tray unit. When the tilt tray unit is thus enabled a unit enabled transmitter 9, carried on the horizontal support bar 104, is switched on and remains switched on until a fault occurs or the power to the tilt tray unit is switched off.

Also located in the track is a unit enabled receiver which is able to detect the output from each unit enabled transmitter 9. As each tilt tray unit passes over the unit enabled receiver the status of it's transmitter is detected or "read" and in this way the status of each unit is determined. Those tilt tray units which are determined to be disabled are taken out of service such that no further items are loaded onto the trays thereof.

Also located in the track at predetermined locations along its length are pairs of tilt tray unit tip transmitters. The outputs from these transmitters are sensed by each tilt tray unit through the medium of a pair of receivers 7 and 8 carried at one end of the horizontal support bar 104. It will be understood that depending on the signals output from each pair of transmitters the tray of each tilt tray unit, as it passes the transmitters is caused to tip or remain level. More specifically, if the receiver 7 detects a signal the controller 11 operates the motor 4 to cause the tray to tip right, if the receiver 8 detects a signal the tray is tipped left, and if both receiver 7 and 8 detect a signal simultaneously the tray is maintained level.

Once the controller 11 sees the output from the receivers 7, 8 and 9 a tip, straighten or reset sequence is initiated for the tilt tray unit. The tilt tray unit will always reset as long as a failsafe limit switch contact 15 is made by the action of a position flag 16 as the tray rotates. The limit switch 15 is used to trip the controller 11 if the tray has tipped past its maximum angle of rotation. The controller 11 defines the tip and straighten sequences. The program in the controller 11 defines rotational speed of tip and uses three sensors 17, 18 and 19 to provide positional feedback in order to control the angle of tip, and the horizontal position of the tray as it is straightened.

It is an object of the present invention to provide a tilt tray sortation system which provides simpler and more effective means for communicating with and controlling the operation of each transport unit over the known system referred to hereinabove.

According to the present invention there is provided a sortation system comprising a plurality of transport units connected end to end to form a continuous train and mounted for movement along a track defining at intervals along its length destination ports at which items carried by the transport units may be discharged under the control of a central control system, wherein the central control system comprises a radio frequency transmitter device through which control signals to the continuous train are transmitted and the continuous train comprises a radio frequency receiver device for receiving the transmitted control signals.

Preferably, the radio frequency transmitter device is connected to a leaky feed aerial which extends the length of the track. The leaky feed aerial may comprise a screened cable having holes in the screening at intervals along its length. The leaky feed aerial may run parallel to the track. Alternatively, it may run within the track itself.

The use of a leaky feed aerial to transmit control signals from the central control system to the continuous train ensures that there are no dead or null spots around the track. In this regard, the track, the destination ports and any associated apparatus can shield and otherwise obstruct the signal from a simple omnidirectional aerial.

Each of the transport units may comprise a radio frequency receiver device connected to an on-board local controller which operates a discharge mechanism of the transport unit in response to received control signals. However, in a preferred embodiment of the present invention the continuous train comprises at least one master transport unit and a plurality of slave transport units associated with the or each master transport unit, and the or each master transport unit comprises a radio frequency receiver device connected to an on-board local controller which operates the discharge mechanism of the master transport unit and each of the slave transport units associated therewith in response to received control signals.

In order to ensure that items carried by a particular transport unit are discharged to the correct destination port, the sortation system in accordance with the present invention further comprises means for determining the position of each transport unit relative to a fixed datum position on the track. In this regard, the position determining means comprises means for detecting the passage of a designated transport unit past a fixed datum position on the track, a counter and means for initiating the distance determining means on detection of the said designated transport unit. The distance determining means may comprise a wheel which turns against the continuous train, or encoder markings running the length of the track which are detectable by optical means. Preferably, the distance determining means comprises sensor means mounted in the track for sensing both the passage of each carriage and the markings on an encoder strip on each transporter unit and a counter for counting same. It will be understood that the count kept by the counter represents the position of the designated transport unit relative to the fixed datum position to an accuracy of the spacing between the markings on the encoder strip and that from this the position of every other transport unit can be determined.

Whilst the central control system is able to determine accurately the instantaneous position of each transport unit relative to the fixed datum position from the count kept, this instantaneous position is only known to the on-board local controller or controllers on the continuous train when data is communicated to it/them by the central control system. Where data communication between the central control system and on the on-board local controller or controllers is two way data communication to the local controller or controllers will be interrupted due to the inherent delay in switching a transceiver from transmit mode to receive mode. Any inaccuracy in the position of the transport units as determined by the on-board local controller or controllers will, of course, result in it discharging its cargo in the wrong place.

To overcome this problem, the sortation system further comprises means for calculating the velocity of the continuous train and for conveying this information to the or each on-board local controller, together with the current positional data determined by the said distance determining means and the on-board local controller comprises means for extrapolating from the velocity of the continuous train the distance travelled at any instant between receiving the current positional data and new positional data being received.

Alternatively, two way communication between the central control system and the or each on-board local controller may be conducted on two separate channels. Data communication from the central control system to the on-board local controllers may take place on one of the said channels, whilst data communications from each of the on-board local controllers to the central control system takes place on the other channel.

Each transport unit is provided with an electric motor which is operable to cause the tray or belt associated therewith to operate. Power may be supplied to each motor separately, or through a common single supply unit, in which case the transport units must be linked together electrically as well as mechanically. Any one of several techniques may be employed to supply power to the electric motors, including:

1. a) A continuous electrical power source is positioned around the perimeter of the sorter track system and power is taken from this via a set of power pick-ups mounted on one or each transport unit, and used where needed.
   b) A staged electrical power source is positioned adjacent to a short length of track enabling a power storage device on board one or each transport units, to pick up and store enough energy to facilitate a tip.
2. A rechargeable battery is provided on one or each transport unit. The rechargeable battery is recharged whenever convenient in the operating schedule of the system.
3. a) Electric power is transmitted to one or each transport unit via a method of magnetic induction. In such a method an electric current is induced from an inductive rail into a pick up carried on one or each transport unit, enabling the power to be used to tip a tray or operate a cross belt The inductive rail may be incorporated within the track or may be spaced therefrom. Where appropriate the transport units may be provided with a power storage device in the form of a battery or capacitor.
   b) A staged inductive power transmission method can also be adopted. This will use magnetic induction to transmit power to one or each transport unit at locally selected 'charging stations', after which the power is stored by a power storage device such as a battery or a capacitor.
4. Power can be generated on each transport unit by the use of a dynamo driven by the wheels of that unit. This may dynamically generate power to operate the discharge mechanism of the transport unit, or the power may be stored in a storage device such as a battery or capacitor for use when needed.

The transport units themselves can be propelled around the track by any of a number of conventional drive techniques, including friction wheel drive, individual motor driven carriages, belt drive, gripper drive, linear induction motor (L.I.M.), servo L.I.M., CAT/Chain drive, and screw drive.

By providing wireless communication between the central control system and each transport unit the performance of the sortation system over conventional systems is improved in several respects. To begin with wireless communication ensures that each transport unit is in virtually constant communication with the central control system. This means that any required command can be immediately relayed to the transport unit and acted upon. It also means that any change in the operating status of a transport unit can be immediately relayed to the central control system, and appropriate action can be instigated. Moreover, and perhaps most significantly, it means that the sortation system is no longer reliant on the positioning of each transport unit to achieve communication to and from the central control system.

An embodiment of the invention will now be described, by way of example, with reference to the accompanying drawings, in which.

Although the present invention is described hereinbelow with reference to a sortation system comprising tilt tray units, it will be understood that the present invention is equally applicable to other types of transport unit, including cross belt sorter units.

In a sortation system according to the present invention tipping of the tray of tilt tray unit is effected by a motor under the control of an on-board local controller. It will be understood that each tilt tray unit may be provided with its own discrete on-board local controller, but that in a practically implemented system a single on-board local controller is connected to and controls several tilt tray units. In this context the tilt tray unit carrying the on-board local controller is referred to as a "master tilt tray unit" and the tilt tray units to which it is connected are referred to as "slave tilt tray units". The number (n) of slave tilt tray units associated with each master transport unit will depend on the particular system. The on-board local controller communicates with a system controller via a radio frequency communication system. This will be elaborated upon hereinbelow.

The tray of each tilt tray unit is held in its normally horizontal position by a parking brake, an electro-mechanically operated latch or some equivalent device. In response to an appropriate control signal from the system controller, the on-board local controller disengages the parking brake or the electro-mechanical latch of a designated tilt tray unit, and energises the motor to cause the tray to rotate in the required direction. The rotation profile of the tray is conveniently controlled using a sensing array, an encoder or a potentiometer to provide positional feedback. The on-board local controller also controls the angle of tilt, and the acceleration and deceleration of the tray. When the items carried by the designated tilt tray unit have been discharged the tray is returned to its normal horizontal position. This may be achieved using a control signal from the system controller, or the on-board local controller may operate to reverse the motor after a predetermined period.

Figures 3, 4:
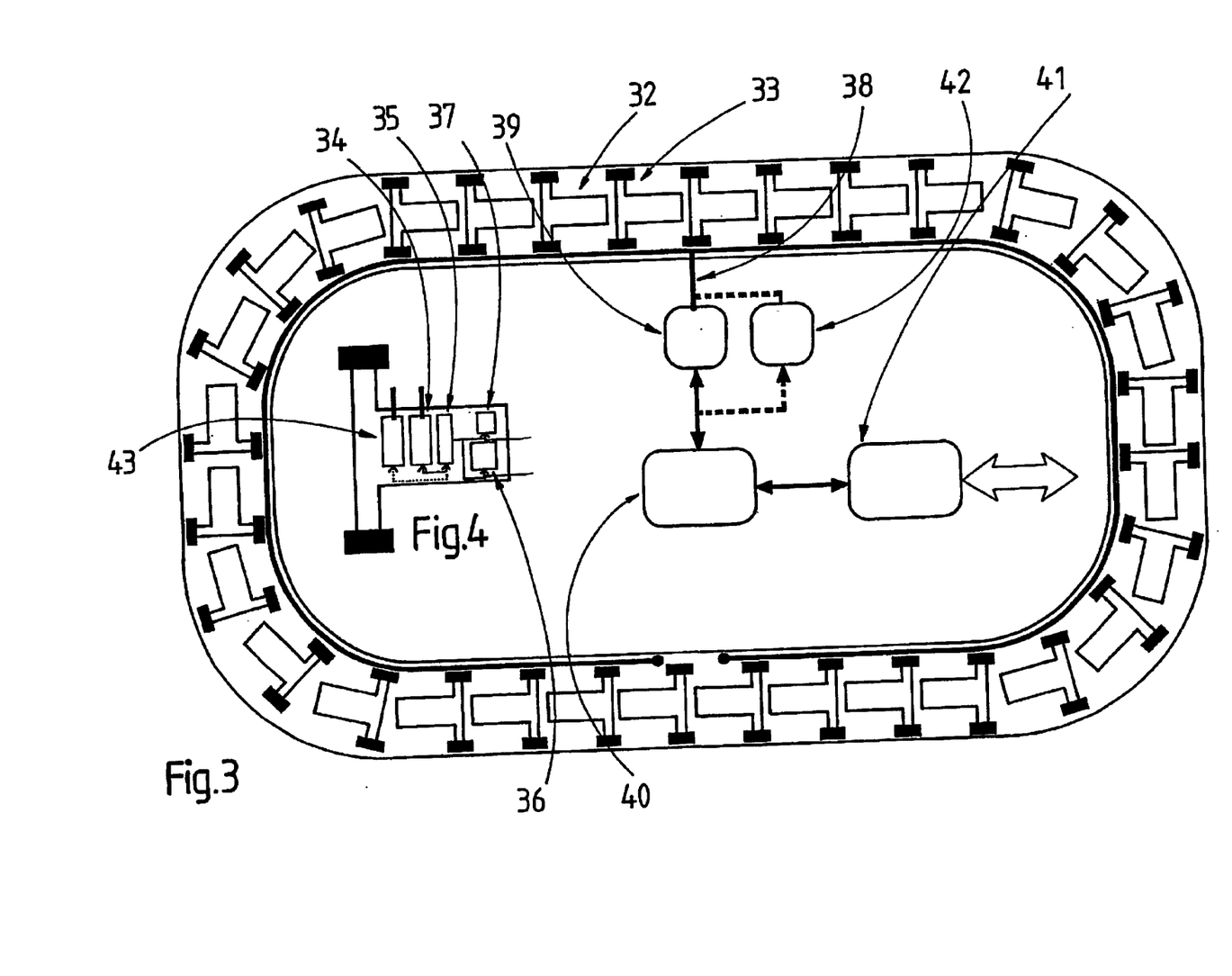
FIG. 3 is a schematic showing the control architecture of a transport sortation system according to the present invention.
FIG. 4 is a schematic showing the on-board local controller of a single master transport unit; and, FIG. 5 is a schematic showing the interface between a master transport unit and a slave transport unit following immediately behind it.

FIG. 3 shows the overall control architecture of a tilt tray sortation system according to the present invention. In this embodiment of the invention a number of tilt tray units are shown of which one is a master tilt tray unit 32, inked to a number (n) of slave tilt tray units 33 to form a continuous train. Although not illustrated in the drawing there are several master tilt tray units each linked to a number of slave tilt tray units to form a plurality of continuous trains, and these continuous trains are in turn linked together to make up the enclosed loop of tilt tray units extending the length of the track shown in FIG. 3.

Each master tilt tray unit 32 comprises a radio frequency modem 34, a programmable controller 35, which communicates with the radio frequency modem 34 via a serial communications cable, and a motor controller 36. An I/O module 37 may also be provided depending upon the type of motor controller 36 selected.

Figure 5:
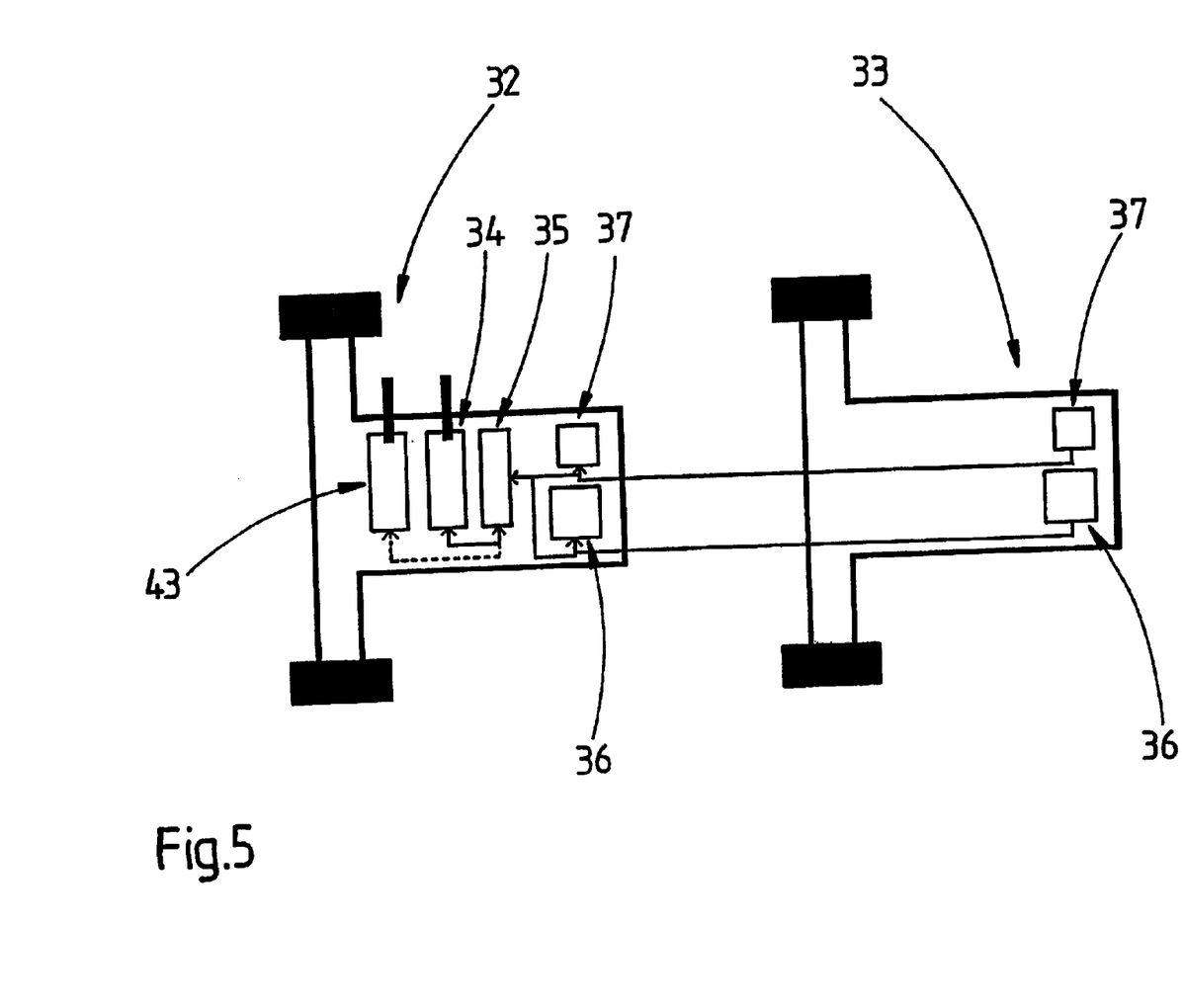

Referring to FIG. 5 it will be seen that the motor controller 36 of the master tilt tray unit 32 is also connected to the motor controller 36 of each slave tilt tray unit 33 in the continuous train using a field-bus, as are the I/O modules 37. However, it will be understood that this is not always the case. Depending upon the configuration the I/O modules may be connected to the master controller 36 of each slave tilt tray unit 33 with no connection between the motor controllers 36 themselves.

Running around the track is a leaky feeder cable 38 which is connected to a radio modem 39. The leaky feeder cable 38 is mounted within the track, but must be positioned at least 50 mm away from any steel work. The radio modem 39 is connected by a serial communications link to a routing controller 40, which in turn is connected via Ethernet, or a high-speed field bus to the system controller 41. The system controller is able to communicate with a number of high level systems such as scanners, SCADA machines, X-ray machines etc, which are used in typical tilt tray sorter installations. Depending upon the nature of the systems with which the system controller 41 must communicate, it may be possible to eliminate the need for the routing controller 40 so that the system controller 41, communicates directly with the radio frequency modem 39.

The operation of the tilt tray units within a continuous train is controlled as follows:

1. The system controller 41 receives information about the destination of any particular item which is to be loaded onto the carrying surface of a tilt tray unit. If a tilt tray unit needs to be reset from a fault condition, or taken out of service, the system controller receives these requests from the SCADA.
2. As the item is inducted onto the tray of a designated tilt tray unit the information about the destination port for that particular unit is passed to the routing controller 40. All other commands are passed to the routing controller at the appropriate time.
3. The routing controller 40 determines the position of the destination port at which the item must be discharged in terms of its absolute distance from a datun position. In this regard it will be understood that each destination port has a distance coordinate which is a measure of the destination port distance from the datum. For all other commands the routing controller determines if these should be done immediately or at a certain position from the datum position.
4. At regular intervals control data is broadcast from the routing controller 40 to the radio frequency modem 39. This control data is in turn broadcast though the leaky feeder 38 into all areas of the track.
5. The radio frequency modem 34 on each and every master tilt tray unit 32 receives the control data broadcast over the leaky feeder 38 and in its turn passes the control data to the respective programmable controller 35.
6. The programmable controller 35 on each master tilt tray unit analyses the control data and at the appropriate time initiates tip commands, reset or straighten commands. These commands are directed to the I/O modules 37 and the motor controllers 36 via the field bus links, and the tip, straighten and reset actions are controlled in this manner.
7. After each outgoing control data message has been broadcast a designated master tilt tray unit 32 reports back to the system controller 41 on the status of the slave tilt tray units 33 which it controls. This status data is transmitted by the master tilt tray modem 34 over the leaky feeder 38 to the system controller modem 39 and is converted into serial communication format as it passes to the routing controller 40.
8. Some of this status data message is required by the routing controller 40, but some information, such as the indication of fault status in a particular tilt tray unit, is passed to the system controller 41, which in turn may communicate with SCADA systems or other devices.

In order for the leaky feeder communication method to work successfully a number of design requirements must be catered for within the sortation system.

Tilt tray sortation system can be over 1 km in length and they may be installed in buildings where there is a large density of steelwork and heavy machinery. The system may also pass through brickwork. As a consequence it is not always possible to ensure effective wireless communication using standard aerial technology. The presence of steel and other surfaces in a radio wave field can result in reflection of the electro-magnetic radiation. At certain positions the reflected waveforms are in anti-phase such that null or dead spots are created where it is impossible to receive or transmit successfully.

The use of the leaky feeder eliminates these problems. The screen of the leaky feeder cable has small holes in it, which causes radiation to leak and create an electromagnetic field around the cable. By ensuring that the aerial of the modem on each of the master tilt tray units is always moving in close proximity to the leaky feeder cable it is possible to eliminate or at least reduce null or dead spots around the path of the track.

A further problem with radio communications is the inherent delay in switching a transceiver from transmit mode to receive mode. This delay is unavoidable if the integrity of the data transmitted is to be maintained at an acceptable level and is typically of the order of 40 ms for each transmission directional change. As the data transmission itself takes a finite time period data can only be transmitted every 200 ms. A tilt tray sorter can travel at speeds of up to 2 $ms^{-1}$ and at this speed this would result in an error in the discharge position of up to 0.4 m, assuming that a command was sent from the system controller and was to be actioned instantly. This is unacceptable for many tilt tray sorter applications.

In order to overcome this particular problem means are provided on board the continuous train of transport units for extrapolating the instantaneous or present position of a particular transport unit relative to a fixed datum position on the track between data transmissions. In this regard the present position of a transport unit is usually determined from information provided to the system controller 41 by sensors (not shown) mounted in the track. These sensors detect both the passage of each tilt tray unit and also the spaced markings on the encoder strip running the length of each tilt tray unit. (These markings are shown on the tilt tray unit described hereinabove with reference to FIGS. 1 and 2.) Thus, the system controller 41 is able to determine the present position of any particular tilt tray unit relative to the fixed datum position to an accuracy equal to the distance between two markings on the encoder strip. However, as indicated above this present position can only be communicated to the local or programmable controller 35 on the or each master tilt tray unit every 200 ms. In order to avoid the need for instructions to the continuous train to be carried out immediately, the programmable controller 35 is able to determine the distance it has travelled at any instant during this 200 ms period beyond the present position previously communicated to it by the central control system using the calculated velocity of the continuous train.

The accuracy of the position where a command is carried out is improved by implementing an extrapolation algorithm which predicts the value of the "present count", that is to say the position of a designated tilt tray unit from a fixed datum position on the track, in the 200 ms between incoming messages. This is generally done by implementing extrapolation algorithm within the programmable controller 35 on each master tilt tray unit 32. In response to a command periodically sent from the routing controller 40, the programmable controller 35 calculates the speed of the continuous train by calculating the rate of change of the present count received from its incoming messages. In this way the actual speed of the continuous train can be determined. As the speed of the continuous train is now known, and the continuous train can generally be relied upon to run at a constant speed during operation, the extrapolation algorithm is able to increment the value of the present count in between incoming messages such that its value is constantly updated. Using this method the need for rapid data transmission rates to achieve high accuracy of tip position etc. is eliminated. However, as an alternative to this the central controller can perform the calculation and transmit to the on-board controller data indicative of the speed of the continuous train.

Every 200 ms the system controller 41 sends out a message to all of the master tilt tray units 32. The message contains in its first byte a query node which is the address of the master tilt tray unit which is required to respond with the status of its associated slave tilt tray units 33. After the message has been sent the master tilt tray unit immediately responds by sending a message back to the system controller. The next two bytes contain the "present count" which is the distance that the first master tilt tray unit in the sorter has moved from a fixed datum position along the track.

The remainder of the message contains the command data for up to fifteen commands. A command requires two registers of information to be transmitted. The first register contains the command, the number of the master tilt tray unit 32, and the number of the slave tilt tray unit associated with the master tilt tray unit. In this way a command can be linked to or designate any of the tilt tray units of a tilt tray sorter.

The second register contains the position where the command should be carried out. The local programmable controller 35 matches the position of the present count with the command position before initialising control of the motor controllers 36.

As an alternative to using the protocol described above the radio frequency control system may operate on a pair of communications channels which are separated in frequency, phase or some other way. In such a system data communication from the central control system to the on-board local controllers is allowed to take place on one of the said channels, whilst data communications from each of the on-board local controllers to the central control system is allowed to take place on the other channel.

By providing a control structure for the sorter as described, incorporating radio communications, a leaky feeder type aerial system, and the carriage design using a master slave type arrangement the performance of the overall system is improved:

1. The requirement for a large number of transmitters placed both in the sorter track and on the carriages is eliminated. This reduces the manufacturing cost and installation cost of a sorter.
2. In order to change the tip position of a destination port a change in a single register of the routing controller is required. There is no longer a need to make physical changes to transmitter positions in the track, or to make software changes in the system controller.
3. Due to the fact that the motor controllers and the programmable controllers on the master tilt tray units are accessible by communications, the tip profile may be changed when the sorter is operational without the need for down loading changes to the motor controllers. This feature allows the tip profile to be changed at different times of the day, or for different types of product.
4. Multi-tip positions may be easily added to allow optimum distribution of product in a discharge chute.
5. The tilt tray units can also be made to 'bank' at curved sections of the sorter track, such that the sorter can have a higher running speed as the product will no longer leave the carrying tray surface at the curved sections of track. In this way sorter throughput can be increased.
6. Upon start up ofthe sortation system the tilt tray units can be enabled into a status ready receive or discharge bags immediately as soon as the sortation system has attained operation speed. This ensures that the sortation system availability is at a maximum.
7. The status of all of the sorter tilt tray units is known at all times due to the fact that the master tilt tray units transmit the status of all of their slave tilt tray units every one to two seconds. Also the precise fault which has occurred can be logged at all a times.

What is claimed is:

1. A sortation system comprising a plurality of transport units connected end to end to form a continuous train and mounted for movement along a track defining at intervals along its length destination ports at which items carried by each of the transport units may be selectively discharged under the control of a central control system, wherein the central control system comprises a radio frequency transmitter device through which control signals to the continuous train are transmitted, and the continuous train comprises a radio frequency receiver device for receiving the transmitted control signals and an on-board local controller for operating each of the transport units in response to a received control signal, wherein the central control system further comprises means for determining the current position of each transport unit relative to a fixed datum position on the track, which current positional data is periodically communicated to the on-board local controller, and the on-board local controller comprises means for extrapolating from the speed of the continuous train the distance travelled at any instant beyond the position previously communicated to it by the central control system.

2. A sortation system according to claim 1, wherein the central control system comprises means for calculating the speed of the continuous train and for communicating to the on-board local controller data indicative of this.

3. A sortation system according to claim 1, wherein the on-board local controller comprises means for calculating the speed of the continuous train.

4. A sortation system according to claim 3, wherein the on-board local controller calculates the speed of the continuous train by determining the rate of change of its position relative to the said fixed datum position from the current positional data periodically communicated to it.

5. A sortation system according to claim 1, wherein the position determining means comprises means for detecting the passage of a designated transport unit past the said fixed datum position, means for continuously determining the distance travelled by the designated transport unit past the datum position and means for initiating the distance determining means on detection of the designated transport unit.

6. A sortation system according to claim 5, wherein the distance determining means comprises sensor means mounted in the track for sensing equidistantly spaced markings on the continuous train, and a counter for counting same.

7. A sortation system according to claim 1 wherein each of the transport units comprises a radio frequency receiver device connected to an on-board local controller which operates a discharge mechanism of the transport unit in response to received control signals.

8. A sortation system according to claim 1, wherein the continuous train comprises at least one master transport unit and a plurality of slave transport units associated with the or each master transport unit, and the or each master transport unit comprises a radio frequency receiver device connected to an on-board local controller which operates the discharge mechanism of the master transport unit and each of the slave transport units associated therewith in response to the received control signals.

9. A sortation system comprising a plurality of transport units connected end to end to form a continuous train and mounted for movement along a track defining at intervals along its length destination ports at which items carried by the transport units may be selectively discharged under the control of a central control system, wherein the central control system comprises a radio frequency transmitter device through which control signals to the continuous train are transmitted, and the continuous train comprises a radio frequency receiver device for receiving the transmitted control signals and an on-board local controller connected to the receiver device which operates the discharge mechanism of a selected transport unit in response to a received control signal, wherein the radio frequency transmitter device is connected to a leaky feed aerial which extends the length of the track.

10. A sortation system according to claim 9, wherein the leaky feed aerial comprises a screened cable having holes in the screening at intervals along its length.

11. A sortation system according to claim 9, wherein the leaky feed aerial runs parallel to the track.

12. A sortation system according to claim 9, wherein the leaky feed aerial runs within the track itself.

13. A sortation system according to claim 8, wherein two-way data communication between the central control system and the or each on-board local controller is conducted on two separate channels.

14. A sortation system according to claim 2, wherein the position determining means comprises means for detecting the passage of a designated transport unit past the said fixed datum position, means for continuously determining the distance travelled by the designated transport unit past the datum position and means for initiating the distance determining means on detection of the designated transport unit.

15. A sortation system according to claim 3, wherein the position determining means comprises means for detecting the passage of a designated transport unit past the said fixed datum position, means for continuously determining the distance travelled by the designated transport unit past the datum position and means for initiating the distance determining means on detection of the designated transport unit.

16. A sortation system according to claim 4, wherein the position determining means comprises means for detecting the passage of a designated transport unit past the said fixed datum position, means for continuously determining the distance travelled by the designated transport unit past the datum position and means for initiating the distance determining means on detection of the designated transport unit.

17. A sortation system according to claim 2 wherein each of the transport units comprises a radio frequency receiver device connected to an on-board local controller which operates a discharge mechanism of the transport unit in response to received control signals.

18. A sortation system according to claim 3 wherein each of the transport units comprises a radio frequency receiver device connected to an on-board local controller which operates a discharge mechanism of the transport unit in response to received control signals.

19. A sortation system according to claim 4 wherein each of the transport units comprises a radio frequency receiver device connected to an on-board local controller which operates a discharge mechanism of the transport unit in response to received control signals.

20. A sortation system comprising:
a central control system;
a track having a length and defining at intervals along said length a plurality of destination ports;
a plurality of transport units connected end to end to form a continuous train, said plurality of transport units mounted for movement along said track, wherein items carried by each of the transport units are selectively discharged under control of said central control system, wherein:
said central control system comprises a radio frequency transmitter device through which control signals to the continuous train are transmitted;
said continuous train comprises: (i) a radio frequency receiver device for receiving the transmitted control signals; and, (ii) an on-board local controller for operating each of the transport units in response to a received control signal;
said central control system further comprises means for determining a current position for each transport unit relative to a fixed position, said current position periodically communicated to the on-board local controller; and,
said on-board local controller comprises means for extrapolating from a speed of the continuous train a distance travelled beyond one of said current positions previously communicated to the on-board local controller by said central control system.

* * * * *